United States Patent [19]

Walz et al.

[11] Patent Number: 4,465,798

[45] Date of Patent: Aug. 14, 1984

[54] WATER-DILUTABLE EPOXIDE, PROCESS FOR PREPARING IT, THE USE THEREOF AND A COATING COMPOSITION

[75] Inventors: Gerd Walz, Wiesbaden; Thaddäus Wirth, Heidenrod-Wisper; Walter Sprenger, Dieburg, all of Fed. Rep. of Germany

[73] Assignee: Hoechst Aktiengesellschaft, Fed. Rep. of Germany

[21] Appl. No.: 357,573

[22] Filed: Mar. 12, 1982

[30] Foreign Application Priority Data

Mar. 14, 1981 [DE] Fed. Rep. of Germany ...... 3109900

[51] Int. Cl.$^3$ ............... C08G 59/04; C08G 59/08; C08L 63/04; C08L 63/10
[52] U.S. Cl. ................... 523/414; 428/413; 428/418; 523/402; 528/361; 528/365
[58] Field of Search ............ 523/414, 402; 428/413, 428/418; 528/361, 365

[56] References Cited

U.S. PATENT DOCUMENTS

| | | | |
|---|---|---|---|
| 3,336,253 | 8/1967 | Wong et al. | 523/414 |
| 3,355,401 | 11/1967 | Tanner | 523/414 |
| 3,397,159 | 8/1968 | Slater et al. | 523/414 |
| 3,464,939 | 9/1969 | van Westrenen | 523/414 |
| 3,926,886 | 12/1975 | Kelley et al. | 523/414 |
| 4,098,735 | 7/1978 | Tobias | 523/414 |
| 4,134,864 | 1/1979 | Belanger | 523/414 |
| 4,148,772 | 4/1979 | Marchetti et al. | 523/414 |

*Primary Examiner*—Allan Lieberman
*Attorney, Agent, or Firm*—Charles A. Muserlian

[57] ABSTRACT

A water-dilutable epoxide which is free from glycidyl ester and glycidyl ether groups, characterized in that it contains, in addition to at least one epoxide group, at least one ester group of a monocarboxylic acid and a further ester group which is vicinally arranged thereto, this further ester group having been obtained by reaction of an OH group with a polycarboxylic monoanhydride, wherein the second COOH group formed from the anhydride by the esterification occurs wholly or partially in the form of a salt with a base; processes for preparing it and the use thereof in aqueous media or media compatible with water.

14 Claims, 1 Drawing Figure

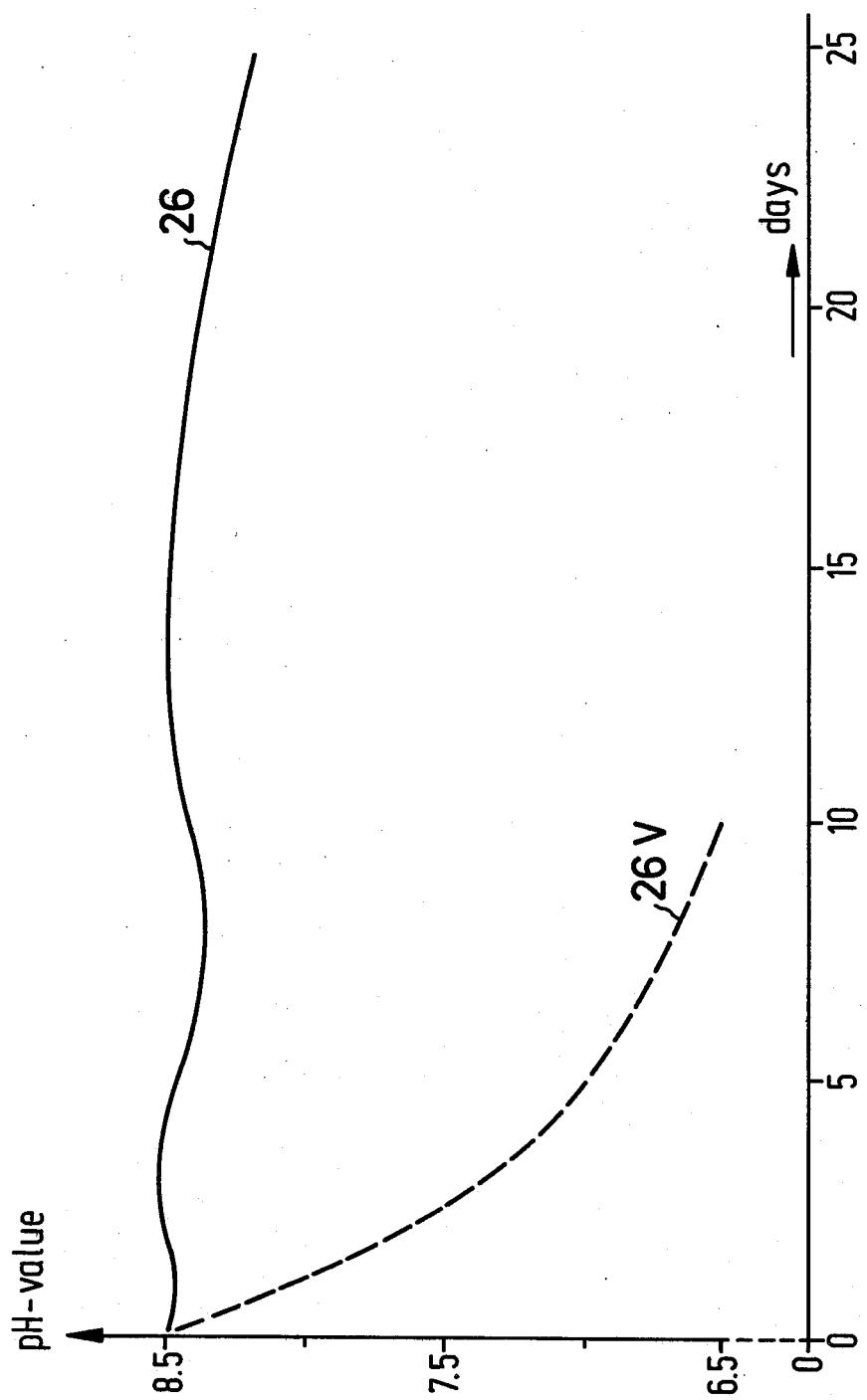

WATER-DILUTABLE EPOXIDE, PROCESS FOR PREPARING IT, THE USE THEREOF AND A COATING COMPOSITION

As binders in the coating industry, polyepoxides with glycidyl ether or ester groups have proved suitable for a wide range of applications, in view of their outstanding and extremely diverse properties.

The polyepoxides are used with appropriate hardeners and additives such as pigments, fillers and catalysts, generally in liquid form, either by being in liquid form from the outset or being put into liquid form by the addition of organic solvents. Depending on the hardeners used, the coatings prepared therefrom harden at ambient temperature or under stoving conditions.

The polyepoxides may also be combined with appropriate hardeners and applied in solid, finely ground form, e.g. as powder coating compositions.

It is generally known to use polyepoxides in a substantially anhydrous, liquid or solid form in the coating industry, but the use of polyepoxides having intact epoxy groups with water as the main solvent in the liquid phase is known from only a few publications.

In one known process, a binder containing epoxy groups, in the form of a finely ground water-soluble powder, is dispersed in a water-soluble binder free from epoxy groups and is deposited, together with this binder, by electrophoresis and then hardened.

According to another known process, a finished, finely-ground, water-soluble powder coating composition, generally containing epoxy groups, is dispersed in water and applied to substrates by conventional techniques such as spraying and then hardened.

In another publication, a solid, finely ground, water-insoluble resin containing epoxy groups is dispersed in a maleinised oil and applied to substrates by conventional methods and then hardened.

It has also been proposed to disperse a solid, finely ground, water-insoluble resin containing epoxy groups with special water-soluble binders and to apply it to substrates by conventional methods and then harden it.

Commercially available products consisting of liquid epoxides which can be emulsified together with suitable amines in water are also known. They are then applied to substrates by conventional methods and hardened in the usual way.

A characteristic of these known epoxides and commercially available products is that the component containing the epoxy groups is present in a hydrophobic dispersed form in water and in that the epoxy groups are therefore not bound to a water-soluble substance.

Dispersed systems of this kind, when used for coatings, have the known disadvantages such as limited workability, poor flow properties, poor gloss, poor covering power and inferior pigmentability compared with dissolved systems.

Stable polyepoxides dissolved in water are described in only one publication. The water-soluble polyepoxides mentioned in this publication have indeed proved satisfactory, but it is nevertheless desirable to prepare products having excess free epoxy groups.

The invention provides a water-dilutable epoxide which is free from glycidyl ester and glycidyl ether groups and is characterised in that it contains, in addition to at least one epoxy group, at least one ester group of a monocarboxylic acid and a further ester group which is vicinally arranged thereto, this further ester group having been obtained by reaction of an OH group with a polycarboxylic monoanhydride, wherein the second COOH group formed from the anhydride by the esterification is wholly or partially present in the form of a salt with a base.

The epoxides according to the invention, which are preferably polyepoxides but may also be monoepoxides, are not only water-soluble but in addition still have the desired free epoxy groups which, as functional groups, may be used for hardening other polymers with correspondingly different functional groups.

Examples of suitable starting polyepoxides include polyepoxides free from glycidyl esters and glycidyl ethers and having at least two epoxy groups in the molecule, e.g. epoxidised fatty acids or the derivatives thereof according to formula

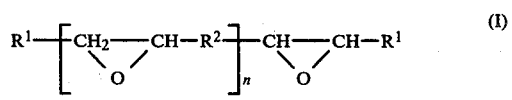

which is shown only as a linear formula but may also be branched, and wherein $R^1$ represents identical or different groups, selected from hydrogen or alkyl groups with 1 to 22, preferably 1 to 5 carbon atoms, the carbon chain of which is optionally interrupted by at least one ester and/or ether group, whilst the ester group may also be adjacent to an epoxy group—and this grouping is also possible in the modified epoxide according to the invention:

$R^2$ represents identical or different alkylene groups with 1 to 22, preferably 2 to 18 carbon atoms, the carbon chain of which is optionally interrupted by at least one ester and/or ether group, whilst the ester group may also be adjacent to an epoxy group—and this grouping is also possible in the modified epoxide according to the invention—and n represents an integer from 1 to 20, for example epoxidised linseed or soya oil, epoxidised esters, e.g. alkyl esters of dehydrated castor oil fatty acid, linolenic or arachidonic fatty acid, the epoxidised fatty acids of the above-mentioned oils and esters and also epoxidised polyolefins, such as epoxidised polybutadiene oil and epoxidised polyisoprene oil. An epoxidised ester of an unsaturated fatty acid is shown, for example, in formula Ia

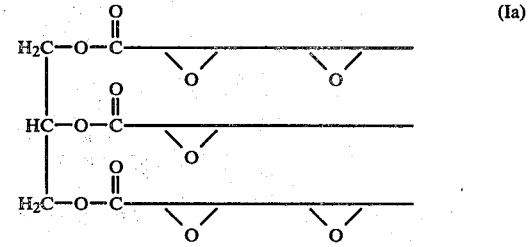

Other examples of starting polyepoxides are compounds of formula II

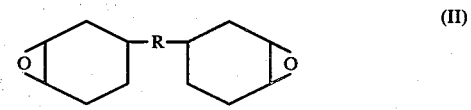

wherein

R represents an alkylene group with 2 to 22, preferably 2 to 18 carbon atoms, which optionally contains at least one intermediate ester and/or ether group, a —COO—CH$_2$— or —CH$_2$—OOC—(CH$_2$)$_m$—COO—CH$_2$— group, wherein m represents an integer from 2 to 8, preferably 2 to 4, for example 3,4-epoxycyclohexylmethyl-3',4'-epoxycyclohexane carboxylate or bis-(3,4-epoxycyclohexylmethyl)adipate.

The monocarboxylic acid group in the modified epoxides according to the invention is advantageously derived from a monocarboxylic acid with 2 to 22 carbon atoms, preferably a monocarboxylic acid with 2 to 18 carbon atoms which is free from aliphatic multiple bonds, e.g. palmitic acid or coconut oil fatty acid, particularly a monocarboxylic acid with 2 to 10 carbon atoms, such as acetic acid, propionic acid, hexanoic acid, isononanic acid, an aromatic acid such as benzoic acid or butyl benzoic acid, or an olefinically unsaturated acid with 3 to 20, preferably 8 to 16 carbon atoms, such as acrylic acid, cinnamic acid, linseed oil fatty acid, dehydrated castor oil fatty acid, oleic acid, linoleic acid linolenic acid, soya oil fatty acid or the like.

In order to obtain particular technical qualities, it is also possible to replace some of the monocarboxylic acid by carboxylic acids with at least two COOH groups or the anhydrides thereof. However, the proportion of monocarboxylic acids should be not less than 50 mol-% and the proportion of COOH groups from these polycarboxylic acids should preferably not exceed 50% of the total COOH groups.

Examples of suitable additional polycarboxylic acids, preferably di- and tricarboxylic acids, include those with 2 to 16 carbon atoms, such as malonic, succinic, glutaric, adipic, suberic, sebacic, citric, propane tricarboxylic, maleic, fumaric, itaconic, citraconic and phthalic acid, the tetra- and/or hexahydro derivatives thereof, the corresponding endomethylene compounds, isophthalic acid, terephthalic acid, naphthalenedicarboxylic acids, trimellitic acid, trimesic acid, and also the other polycarboxylic anhydrides mentioned hereinafter, or the corresponding carboxylic acids.

Examples of polycarboxylic monoanhydrides, on which the modified epoxides according to the invention are based, include, anhydrides of di- or trivalent, preferably carbocyclic or aliphatic carboxylic acids, such as phthalic anhydride, tetra- and hexahydrophthalic anhydride, the corresponding endomethylene compounds, trimellitic anhydride, succinic anhydride and the halogenation products of these anhydrides, if they exist, hexahydrophthalic anhydride being preferred.

The bases used for salt formation are, predominantly, tertiary amines, e.g. aryl-, aralkyl- and/or alkylamines or mixed aliphatic-aromatic amines such as trimethyl-, triethyl- or tripropylamine, dimethylisopropylamine, diethylisopropylamine, dimethylisobutylamine, phenyl dialkylamine, e.g. phenyl dimethylamine, diphenylalkylamine, such as diphenylmethylamine and the corresponding homologues and pyridine. The proportion of these bases in the modified epoxide is generally from 0.1 to 15, preferably from 1 to 10% by weight, based on the reaction product which has not been converted into a salt.

In some cases it is also possible to use inorganic bases, e.g. alkali and/or alkaline earth metal compounds. However, this is not a preferred embodiment of the invention.

The water-dilutable modified epoxides may be prepared as follows:

(a) in a first step a part of the epoxide groups of a starting polyepoxide, which is free from glycidyl ester and glycidyl ether groups, is esterified with a monocarboxylic acid, to form an ester group and an OH group which is vicinally arranged thereto, (b) simultaneously or, preferably, in a second step, the free OH groups are reacted with at least one polycarboxylic monoanhydride in the presence of a base, preferably a tertiary amine, whereby the anhydride group is opened up and one COOH group thereof is esterified and the second COOH group is at least partially converted into the salt with the corresponding base, and then (c) the product is obtained per se or is diluted, in a further step, with a suitable solvent, preferably water, and, if desired, further quantities of base, preferably tertiary amines, including tertiary alkanolamines, are added thereto.

Generally, in the reaction with the monocarboxylic acid, one hydroxyl group is produced per molecule of epoxide compound. It is possible to convert either less or more than one epoxide group per molecule of epoxide compound into hydroxyl groups in this way. The hydroxyl numbers of the compound thus produced should conveniently be between 20 and 200, preferably between 40 and 100.

The reaction in the first step is usually effected at a temperature of at least 30° C. and not more than about 200° C., preferably at between 30° and 140° C. The addition of the monoanhydrides in the second step is generally effected at between ambient temperature and 120° C., preferably at 30° to 100° C. In some cases, it is also possible to exceed the upper temperature of this range, e.g. when the reaction is carried out under increased pressure.

This addition of the monoanhydrides, like the reaction in the first step, may also be effected in the presence of organic solvents free from hydroxyl groups. Generally, however, it is not necessary to use such solvents.

Examples of solvents for this operation include aliphatic hydrocarbons, such as petrol, ligroin, aromatics such as benzene, toluene, xylene, chlorobenzene, nitrobenzene, cyclohexane, ethyl acetate, butyl acetate, ethylene glycol-bis-acetate, N,N-dimethylformamide, N,N-dimethylacetamide, dimethylsulphoxide, N-methylpyrrolidone, N,N',N''-hexamethylphosphoric acid triamide, phosphoric acid -tris-(dimethylamide), ketones such as acetone, methyl ethyl ketone and dibutyl ketone, cyclohexanone, isophorone, acetophenone, and ethers such as diethyl ether, dipropyl ether and ethyleneglycol-bis-ethyl ether.

When the reaction with the monocarboxylic acid is carried out at the same time as the reaction with the monoanhydride, it is usually effected at from ambient temperature to 120° C.

In the esterification with the monocarboxylic acid, appropriately up to 80, preferably 10 to 50% of the epoxide groups of the starting epoxide are esterified. A catalyst may also be present, e.g. alkali metal salts and/or alkali metal hydroxides, tertiary amines, e.g. those mentioned hereinbefore, quaternary ammonium salts, e.g. choline, tetraalkylammonium hydroxide or halides, e.g. tetrabutylammonium iodide or chloride or the alkyl substitution products of these ammonium compounds, and also chromium-III compounds. If catalysts are present, the reaction may be effected at ambient temperature.

It is also possible to react the polycarboxylic monoanhydride in admixture with bisanhydrides. However, the proportion of bisanhydrides should not exceed 20 mol-% of the total anhydride components. Examples of suitable bisanhydrides include pyromellitic anhydride, reaction products of trimellitic anhydride with polyhydric alcohols such as ethanediol, the propanediols, glycerol, pentaerythritol or the like, as described, for example, in German Offenlegungsschrift No. 27 54 399, and also bisanhydrides according to one of the formulae (III) to (VIII), (X) and (XII) as follows:

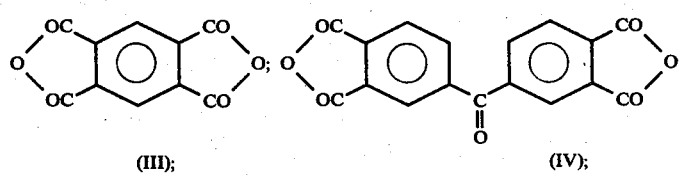

(III); (IV);

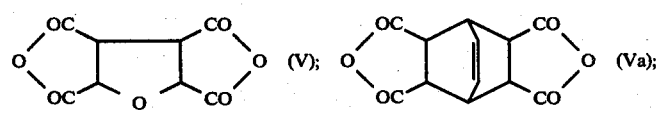

(V); (Va);

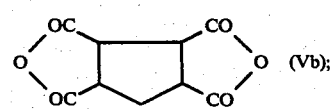

(Vb);

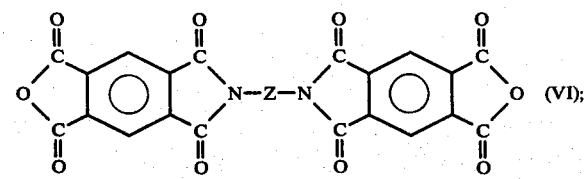

(VI);

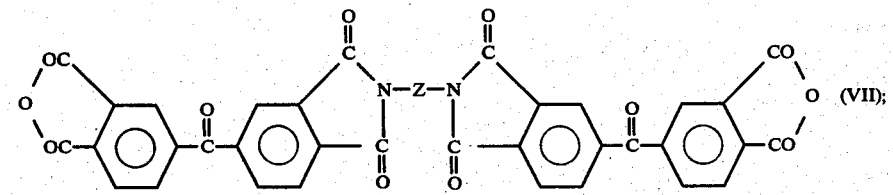

(VII);

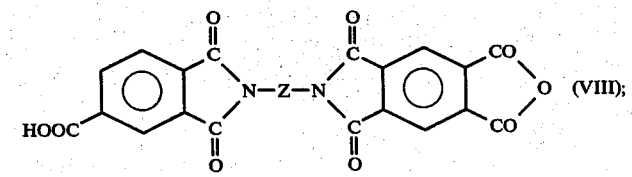

(VIII);

(where Z is $(CH_2)_m$, m is 2–8, and Z may also be any of the groups designated as (IX).

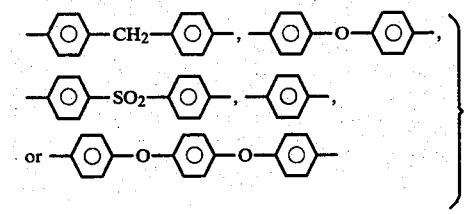

(IX)

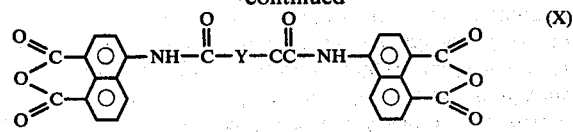

(X)

where Y is —⌬—, —⌬—, —⌬—⌬— or $(CH_2)_p$ and $P = 2 - 8$;

(XI)

(XII)

If the products obtained according to the invention are isolated as such, they may be stored without difficulty. If they are diluted with a solvent, the solvent used for this is generally water, optionally with the addition of organic solvents, preferably those which can be diluted with water, e.g. alkanols with up to 6 carbon atoms, such as methanol, ethanol, the propanols, butanols, pentanols and hexanols or alkanediols with up to 5 carbon atoms, such as ethanediol, propanediol or the oligomers, esters and/or ethers thereof, and also butanediol or pentanediol. On the other hand, it is also possible to use solvents which cannot be diluted with water, such as aromatics, e.g. benzene, toluene, xylene and also petrols or ketones, e.g. acetone, methyl ethyl ketone or the like.

If desired, bases may also be added to the solvent, whilst appropriately the pH of the aqueous solution is adjusted to a range from 5 to 11, preferably 6 to 9, in order to avoid any undesirable internal condensation of the product. The bases may, for example, be selected from those which may be used for salt formation, as mentioned above.

The epoxides according to the invention, diluted with water, surprisingly have a very good shelf life, e.g. four weeks at 50° C. In addition to being water-soluble, the modified epoxides according to the invention also have the property, thanks to the free epoxide groups which they contain, of being able to harden without any difficulty both on their own and combined with amine resins in the presence of compounds bearing the amine and/or ammonium salts of COOH groups and acting as hardeners. Particularly convenient hardeners are the salts of polycarboxylic acids, e.g. of the polycarboxylic acids mentioned hereinbefore. It is particularly preferable to use resins which are soluble or dispersible in water, the free COOH groups of which are neutralised with amines, as the hardeners, either on their own or together with the amine hardeners mentioned hereinbefore.

Examples of resins with COOH groups wholly or partially converted into salts include the known saturated or unsaturated polyesters or polymers, e.g. acrylic polymers such as copolymers of acrylic and/or methacrylic acid with other copolymerisable monomers or maleic acid/styrene copolymers. Water-dilutable polyesters according to U.S. patent application Ser. No. 357,571, filed Mar. 12, 1982 and now U.S. Pat. No. 4,390,688 are particularly interesting. These polyesters based on (A) dicarboxylic acid units, (B) at least one polycarboxylic monoanhydride, other than phthalic anhydride and maleic anhydride, incorporated as a half ester, and (C) an alcohol component comprising at least dihydric alcohols, are prepared from (D) at least one chemically incorporated epoxide compound containing at least two oxirane rings, selected from the group consisting of epoxidised fatty acids, the derivatives thereof and epoxidised aliphatic hydrocarbons or mixtures thereof with up to 30% monoepoxides, the percentage referring to epoxide groups, whilst the COOH groups of the polyester are at least partially present as ammonium salts. The weight ratio of the modified epoxides to the resins with COOH groups partially or totally converted into salts is appropriately (10 to 90):(90 to 10), preferably (10 to 50):(90 to 50). When these components are combined, the cross-linking of the carboxyl groups produces elastic, flexible, highly waterproof coatings which are surprisingly also highly resistant to alkali. Moreover, it has been found that the workability of such mixtures is improved significantly by the presence of the polyepoxides according to the invention. Thus, for example, no undesirable settling of the pigments occurs and, if organic pigments are used, a better gloss is obtained with these aqueous systems than hitherto. Furthermore, if the coating is applied by spraying, a smooth surface is obtained. In addition, greater layer thicknesses can be produced in this way without formation of bubbles during thermal hardening.

Since it is important for environmental reasons that the acid numbers of dispersions or of polyesters and/or polymers neutralised with amines be kept as low as possible so that the amine content is also low, the density of cross-linking which can be obtained by combination with water-soluble epoxides alone is not very great, and therefore it is particularly advantageous to use amine resins as additional hardeners.

Amine resins which may be used include, for example, melamine and/or urea resins, particularly hexamethoxymethylmelamine or partial etherification products of hydroxymethylmelamines.

These amine resins may be used, for example, in an amount of from 0 to 50, preferably from 5 to 40% by weight, based on the total weight of the modified epoxides and the hardeners containing COOH groups.

Hardening may also be effected in the presence of catalysts, particularly if it is carried out at low temperature. The catalysts which are suitable for the esterification with the monocarboxylic acid may also be used here. Hardening may be effected at between ambient temperature and 300° C., preferably between 50° C. and 180° C. If amine resins are additionally used, temperatures as low as 60° to 80° C. will be sufficient for total hardening, even without additional catalysts.

The epoxides according to the invention are used predominantly as binders in aqueous media or media which are compatible with water, more particularly in the production of paints and hardened coatings. They may also be combined with substances containing COOH groups and/or with amine resins. These combinations may be deposited by electrophoresis. Within the scope of the invention, the epoxides according to the invention may also be used as additives to be incorporated in dispersions of monomers and/or polymers. Being water-soluble, the epoxides may serve as emulsifiers. This is the case, for example, when the monomers are subjected to emulsion polymerisation. Stable polymer dispersions are obtained thereby.

The drawing is a graph illustrating pH value as a function of storage time, comparing the values of Example 26 and comparison Example 26 v.

On the other hand, it is also possible for the modified epoxides according to the invention to be used as stabilisers, e.g. for polymer dispersions preferably prepared wholly or partly from chlorine-containing monomers such as vinyl chloride, or for stabilising the pH in aqueous solutions or dispersions of binders with saponifiable groups, e.g. COOH and/or ester groups.

The invention is illustrated by the following Examples, in which % represents percent by weight, T represents parts by weight and EEW stands for epoxy equivalent weight (based on solid resin).

EXAMPLES (I) Preparation of the modified epoxides (1) In a flask fitted with a reflux condenser, stirrer, thermometer and heating apparatus, 245 T of epoxidised soya oil with an epoxy equivalent weight of 260 and a solution of 0.26 T of lithium hydroxide and 16.5 T of acetic acid are heated to 100° C. for 15 hours, with gentle refluxing. The acid number is then 4. The mixture is cooled to 50° C. Then 30.8 T of phthalic anhydride and 21 T of anhydrous triethylamine are added. After 4 hours at 50° C., the acid number is 52. The mixture is then diluted with 470 T of deionised water. An opaque solution is obtained with a pH of 7.8 and a solids content of 40%; EEW 492.

(2) In the reaction vessel used in Example 1, 245 T of epoxidised soya oil as in Example 1, 16 T of acetic acid and 0.5 T of dehydrated chromium (III) octoate are gently refluxed at 110° C. for 3½ hours. The acid number is then 0.9. The mixture is cooled to 50° C. and then 36.6 T of phthalic anhydride and 25 T of anhydrous dimethylisobutylamine are added and the resulting mixture is kept at 50° C. for 4 hours. The aqueous acid number is then 48.7. The mixture is diluted with 485 T of deionised water to give a clear 40% solution with a pH of 7.5; EEW 520.

(3) 612.5 T of epoxidised soya oil as in Example 1 and 50.9 T of propionic acid and 0.5 T of choline are heated to 110° C. for 4 hours as in Example 1. The acid number is then 0.6. The mixture is cooled to 50° C. and 83.9 T of phthalic anhydride and 57.2 T of triethylamine are added thereto. After 4 hours' reaction at 50° C., the acid number is 45. After the addition of 1216 T of deionised water, a slightly opaque 40% solution is obtained, pH=8.5; EEW 460.

(4) Example 2 is repeated, except that the mixture is heated to 110° C. for 4 hours. The acid number is then 0.7. The mixture is cooled to 50° C. and 24.5 T of maleic anhydride and 25.3 T of triethylamine are added thereto. After 3 hours' reaction at 50° C., an acid number of 50 is obtained and then the mixture is diluted with 467 T of deionised water to give a dark opaque solution, pH=7.2; EEW 505.

(5) In the reaction vessel described in Example 1, 234 T of the epoxidised soya oil are heated to 110° C. for 4 hours with 16 T of acetic acid and 0.2 T of dehydrated chromium (III) octoate, and then the mixture is cooled to 50° C. The acid number is 1.6. Subsequently, 48 T of endomethylene hexahydrophthalic anhydride and 26.6 T of triethylamine are added and the mixture is heated to 50° C. for 7 hours. The acid number is 67. The mixture is diluted to 40% with 487 T of deionised water. The solution, with a pH of 8.1, is adjusted to a pH of 9.0 with dimethylaminoethanol. The solution is clear; EEW 546.

(6) Preliminary product A: 1470 T of the epoxidised soya oil as in Example 1 are refluxed at 110° C. for 6 hours with 99 T of acetic acid and 3 T of tetrabutylammonium hydroxide. The acid number is 1.6.

Preliminary product B: 308 T of hexahydrophthalic anhydride and 192 T of trimellitic anhydride are melted at 160° C. and cooled to 100° C. 101 T of triethylamine are carefully added from a dropping funnel.

500 T of preliminary product A, 68.7 T of preliminary product B, 35.1 T of phthalic anhydride and 43.2 T of triethylamine are reacted, first for 45 minutes at 70° C., with stirring, in a flask fitted with a reflux condenser. Then the mixture is reacted for a further 3 hours at 50° C. until an acid number of 60 is obtained. Then the mixture is diluted to 40% with 970 T of deionised water and the pH is adjusted to 8.5 with dimethylaminoethanol. A clear solution is obtained; EEW 640.

(7) Preliminary product: 1613 T of epoxidised linseed oil (EEW 180), 45 T of trimellitic anhydride, 127.1 T of acetic acid and 0.9 T of chromium (III) octoate are refluxed for 3 hours, with stirring, until an acid number of 0.8 is obtained.

500 T of this preliminary product, 101.5 T of hexahydrophthalic anhydride and 59.5 T of triethylamine are heated to 60° C. for 4 hours in the reaction vessel used in Example 1. The acid number is then 53.6. The mixture is adjusted to a 40% solution with 991 T of deionised water. A pH of 9.2 is obtained by the addition of dimethylaminoethanol. The solution is clear to slightly opaque; EEW 380.

(8) In a reaction vessel as in Example 1, 440 T of the epoxidised linseed oil according to Example 7, 33 T of acetic acid and 0.5 T of chromium (III) octoate are heated to 110° C. for 4 hours until an acid number of 0.25 is obtained. After cooling to 80° C., 97.5 T of hexahydrophthalic anhydride and 5.8 T of tripropylamine are added and the mixture is heated to 80° C. for 10 hours until an acid number of 50.6 is obtained. Then the reaction mixture is diluted with 917 T of water and 34.8 T of dimethylaminoethanol to give a 40% solution. The pH is 8.8, the solution is opaque; EEW 362.

(9) 474 T of epoxidised polybutadiene oil (EEW=242), 30 T of acetic acid and 1 T of tetramethylammonium hydroxide are heated to 110° C. for 4 hours in the apparatus used in Example 1 until the acid number is 2. The reaction mixture is then cooled to 60° C. and 20 T of diethylisopropylamine and 55.4 T of succinic anhydride are added and the mixture is kept at 60° C. for 8 hours until the acid number is 50. Then the reaction mixture is diluted to 40% with 870 T of deionised water and the pH is adjusted to 8.0 with dimethylaminoethanol. A clear to slightly opaque product is obtained; EEW 487.

(10) Preliminary product: 450 T of epoxidised linseed oil (EEW=180) and 450 T of the epoxidised soya oil are heated to 100° C. with 59.6 T of acetic acid and 0.5 T of dehydrated chromium (III) octoate for 5 hours, with stirring and whilst refluxing gently, until the acid number is 2.

450 T of the preliminary product and 44.5 T of succinic anhydride and 20 T of diethylisopropylamine are reacted at 60° C. for 8 hours until the acid number is 50. Then the mixture is adjusted to a 40% solution with a pH of 7.5, using 772 T of deionised water and dimethylaminoethanol. The solution is opaque; EEW 430.

(11) 950 T of epoxidised linseed oil as in Example 10, 160.4 T of dehydrated castor oil fatty acid, 50 T of acetic acid and 1 T of tetrabutylammonium hydroxide are reacted at 110° C., with stirring and refluxing, until the acid number is 3.

Then 257.3 T of tetrahydrophthalic anhydride and 15 T pyridine are added and the mixture is kept at 70° C. until the end number is 50. The mixture is diluted with 2126 T of deionised water to give a 40% solution which is adjusted to pH 9.5 with dimethylaminoethanol. The solution is opaque; EEW 356.

(12) Preliminary product: 700 T of the epoxidised soya oil, 200 T of 3,4-epoxycyclohexylmethyl-3',4'-epoxycyclohexane carboxylate (EEW=140), 56.8 T of acetic acid and 2 T of chromium (III) octoate are heated to 110° C. for 3 hours. The acid number is 0.6.

450 T of the preliminary product and 44.5 T of succinic anhydride and 15 T of anhydrous triethylamine are reacted at 60° C. for 8 hours until an acid number of 50 is obtained. The product is diluted to 40% with 764 T of water and then adjusted to a pH of 8.2 with dimethylaminoethanol. An opaque solution is obtained; EEW 420.

(13) In the reaction vessel used in Example 1, 160 T of epoxidised methyl linoleate (EEW=161) are heated to 110° C. for 4 hours with 30 T of acetic acid and 0.5 T of tetramethylammonium hydroxide. After the reaction the acid number is 0.8. The reaction mixture is cooled to 50° C. and 77 T of hexahydrophthalic anhydride and 50 T of triethylamine are added and the mixture is then kept at 50° C. until the acid number is 85. Then the reaction mixture is diluted with 317 T of deionised water to give a 50% solution. A substantially clear solution is obtained, pH 8.8; EEW 355.

(II) Preparation of coatings

(14) Two metal sheets are coated with a standard commercial white pigmented stoving enamel of stable colour, consisting of a mixture of acrylic resin and melamine resin and then stoved. Then a dispersion of a copolymer based on ethylene, vinyl chloride and vinyl acetate is mixed with 10% of water-soluble epoxide according to Example 1 (solid to solid) with stirring. This coating composition is applied to one of the sheets as a clear varnish coating and then dried in air.

(14) V (Comparison): A clear varnish coating consisting of the same polymer dispersion but without the addition of the epoxide according to the invention is applied to the other sheet and then dried in air.

Both coatings were exposed to the weather in South Florida. The coating stabilised with water-soluble epoxide still had good gloss and only very slight yellowing even after one year's weathering, whilst the non-stabilised coating was extremely yellow and had a matt surface.

(15) to (22) In these examples, the quantity of polyester solution specified in the following Table 1 is mixed with the specified quantity of water-soluble epoxide according to the invention. Then a quantity of titanium dioxide corresponding to the solids content of the mixture is added and the mixture is triturated in a bead mill. The coating composition is then mixed with the quantity of melamine resin specified in Table 1, and then homogenised. Deionised water is then added to give a spray viscosity of 18 DIN seconds in a 4 mm cup. After being left to stand for three days, the coating compositions are sprayed onto phosphated steel sheets using spray guns and, after a drying time of 20 minutes at ambient temperature, under the conditions specified in Table 2, they are stoved. The dry film thickness of the coatings is about 40 μm in each case.

Unless otherwise stated, a 50% aqueous solution of a polyester according to U.S. patent application Ser. No. 357,571, filed Mar. 12, 1982 and not U.S. Pat. No. 4,390,688 was used as the polyester and a 40% solution was used as the epoxide component in each case.

Hexamethoxymethyl melamine was used as the amine resin in Examples 15 to 17 and 22, whilst a hydroxymethyl melamine partially etherified with methanol was used as the amine resin in Examples 19 and 20.

(23) 50 T of a 50% polyester solution according to Example 3 of patent application No. . . . (corresponding to P 31 09 968.8) filed on the same day were mixed with 62.5 T of 40% aqueous epoxide solution as in Example 1 and adjusted to pH 8.0 with dimethylaminoethanol. Then 100 T of titanium dioxide was added and the resulting mixture was triturated in a bead mill. Then 100 T of a 50% acrylate dispersion containing hydroxyl and carboxyl groups and based on butyl acrylate, methyl methacrylate, hydroxyethyl acrylate and acrylic acid, together with 10 T of hexamethoxymethyl melamine were added thereto and the mixture was adjusted with deionised water to give 18 DIN seconds in a 4 mm cup and then sprayed on to Erichsen sheets. The properties of the films obtained according to this example and according to Examples 15 to 22 are shown in Table 2 which follows.

(24) 100 T of the water-soluble epoxide (40%) of Example 7 are triturated with 200 T of titanium dioxide, with the addition of 50 T of deionised water and 2 T of sodium polyphosphate, in a bead mill. Then 120 T of a 50% acrylate dispersion based on butyl acrylate, methyl methacrylate, styrene and acrylic acid were added, with gentle stirring, and then 2 T of choline were added. Wet films were applied in a layer thickness of 200 μm to a glass sheet, using a spreader. The film is dried at ambient temperature for 14 days. A non-adhesive high-gloss film is obtained, with good water-resistance and wear-resistance.

(25) 160 T of a 50% polyester solution as in Example 3 of U.S. patent application Ser. No. 357,571, filed Mar. 12, 1982 and now U.S. Pat. No. 4,390,688 are mixed with 75 T of aqueous epoxide (40%) as in Example 11. The mixture is pigmented with iron oxide red (100:50 solid to solid) by known methods and then diluted with water/ethylene glycol monoethyl ether (10:1) to give a 15% solids content. The electrophoresis bath is adjusted to a temperature of 25° C. and phosphatised iron sheets are suspended therein. The electrophoresis coating composition is deposited at the anode at a voltage of 150 V. The films are dried and then stoved for 30 minutes at 170° C. The coating has exceptional resistance to salt spray and chemicals.

TABLE 1

| Example No. | Aqueous polyester solution | | Type+ Example No. | Solution of water-soluble epoxide | | Melamine resin T | Catalyst | |
|---|---|---|---|---|---|---|---|---|
| | T | % | | T | According to Example | | T | Type |
| 15 | 160 | 50 | 1 | 50 | 6 | 30 | — | |
| 16 | 150 | 55 | 2 | 50 | 11 | 20 | 0.5 | Choline |
| 17 | 160 | 50 | 3 | 75 | 10 | 30 | 0.5 | LiOH,H$_2$O |
| 18 | 140 | 50 | 4 | 75 | 11 | — | 0.5 | Tetramethyl-ammonium hydroxide |
| 19 | 200 | 40 | ++ | 25 | 9 | 20 | — | |
| 20 | 160 | 50 | 4 | 50 | 11 | 20 | 1.0 | Choline |
| 21 | 145 | 50 | 5 | 90 | 8 | — | 0.5 | Tetrabutyl-ammonium-hydroxide |
| 22 | 120 | 50 | 3 | 75 | 4 | 30 | | |

+Taken from the specified Example in Patent Application . . . (corresponding to P 31 09 968.8) filed on the same day
++Derived from pentaerythritol, isophthalic acid and dehydrated castor oil fatty acid

TABLE 2

| Example No. | Hardining 30 min/°C. | Gloss (according to Lange, 60°) (DIN 67 530) | Pendulum hardness (according to Konig) (DIN 53 157) | Resistance to Xylene min | Resistance to 10% NaOH h | Erichsen cupping (DIN 53 156) mm | Reverse impact cupping (inch. pound) (ASTM-D 2795-69) | Lattice cut 0 = best result 5 = worst result (DIN 53 151) |
|---|---|---|---|---|---|---|---|---|
| 15 | 140 | 88 | 135 | 8 | 24 | 9.7 | 40 | 0–1 |
| 16 | 130 | 86 | 156 | 10 | approx. 20 | 10.2 | 100 | 0 |
| 17 | 160 | 82 | 192 | >30 | >48 | 8.2 | 60 | 1 |
| 18 | 120 | 88 | 160 | 3 | 8 | 9.5 | 160 | 0–1 |
| 19 | 130 | 92 | 195 | 30 | 4 | 7.2 | — | 1 |
| 20 | 90 | 85 | 145 | 11 | 7 | 9.6 | 44 | 0 |
| 21 | 130 | 82 | 120 | 2 | 2 | 10.5 | 80 | 0–1 |
| 22 | 160 | 89 | 170 | 12 | 24 | 10.8 | 120 | 0 |
| 23 | 140 | 88 | 160 | 20 | >72 | 8 | 20 | 1 |

(III) Discussion of the results

As can be seen from Table 2, the coatings prepared with the epoxides according to the invention not only have high gloss (cf. in particular Example 19) but also very good mechanical properties which are demonstrated particularly by the high Erichsen cupping values and the high impact cupping values. In addition, the coatings have good adhesion and elasticity. This is shown by the excellent values obtained in the lattice cut test.

A particularly surprising quality is the high chemical resistance, particularly the alkali resistance of the coatings, which is far superior to that usually obtained with aqueous systems and which constitutes an additional advantage, besides the other favourable technical qualities.

Moreover, the Florida test was carried out for a period of 18 months on the coatings. Only a slight reduction in gloss was found, which means that the coatings also have good resistance to weathering.

(IV) Use as stabilising or emulsifying component

(26) A 40% solution, in water/diacetone alcohol (9:1), of a polyester based on pentaerythritol, isophthalic acid and dehydrated castor oil fatty acid is adjusted to a pH of 8.5 using dimethylaminoethanol and then mixed with the water-soluble epoxide of Example 11 (70 T of solid polyester + 30 T of solid epoxide) and stored in a drying cupboard at 50° C. The fall in the pH value is monitored.

26 V (Comparison): The same procedure is used as in Example 26, except that no epoxide according to the invention is added.

The fall in the pH value as a function of the storage time at 50° C. is illustrated in the accompanying graph. Graph 26 shows the values obtained with Example 26, whilst graph 26 V shows the pattern of the pH value in the comparison test. A comparison of the two curves clearly shows the pH-stabilising effect of the water-soluble epoxide according to the invention as against the pure polyester resin.

(27) 300 T of water, 9.6 T of polyvinyl alcohol and 80 T of 40% water-soluble epoxide as in Example 11 are placed in a 2 liter flask fitted with a stirrer, reflux condenser and regulatable heating means and two dropping funnels, and the mixture is then heated to 60° C. Then 2.4 T of ammonium peroxydisulphate, dissolved in 40 T of water, are added from one dropping funnel and at the same time, from the other dropping funnel, 480 T of vinyl acetate are added in batches over a period of 3 hours. The resulting mixture is then polymerised for 3 hours at 60° C.

A stable dispersion is obtained which is suitable for glues and which is highly waterproof.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A water-dilutable epoxide derived from a substance selected from the group consisting of epoxidized fatty acids, derivatives thereof and epoxidized polyolefins and being free from glycidyl ester and glycidyl ether groups and containing at least one epoxide group, at least one ester group of a monocarboxylic acid or of a polycarboxylic acid, the latter ester groups not exceeding 50% of the total amount of ester groups thus derived from monocarboxylic acids and polycarboxylic acids and a further ester group being vicinally arranged thereto, which further ester group has been formed by reaction of an OH-group with a polycarboxylic monoanhydride, wherein the second COOH-group which has been formed from the anhydride by the esterification is at least partially present in the form of a salt of a base selected from the group consisting of tertiary amines and inorganic bases, the said further ester groups being present in an amount of up to 50% referred to the sum of these ester groups and the remaining free epoxide groups, thus at least 50% of the original epoxy groups still being unchanged and the proportion of the base in the modified epoxide being in the range from 0.1 to 15% by weight based on the reaction product which has not been converted into a salt.

2. An epoxide as claimed in claim 1 wherein the monocarboxylic group is derived from a monocarboxylic acid having from 2 to 22 carbon atoms and wherein the polycarboxylic monoanhydride is that of at least one carbocyclic or aliphatic polycarboxylic acid or a combination thereof.

3. An epoxide as claimed in claim 1 which is a polyepoxide.

4. An epoxide as claimed in claim 1 wherein the base is a tertiary amine.

5. A coated article the coating of which is derived from an epoxide as claimed in claim 1.

6. An epoxide as claimed in claim 1 wherein the proportion of the base in the modified epoxide is in the range from 1 to 10% by weight, based on the reaction product which has not been converted into a salt.

7. An epoxide as claimed in claim 1 in which the further ester groups are present in an amount of from 10 to 50% referred to the sum of these further ester groups and the remaining free epoxide groups.

8. A process for the manufacture of an epoxide as claimed in claim 1 wherein
   (a) in a first step up to 50% of the epoxide groups of a starting polyepoxide being free from glycidyl ester and glycidyl ether groups are esterified at a temperature of at least 30° C. and at most 200° C. with a monocarboxylic acid or a polycarboxylic acid, the latter ester groups not exceeding 50% of the total amount of ester groups thus derived from monocarboxylic acids and polycarboxylic acids, under formation of an ester group and an OH-group being vicinally thereto thus at least 50% of the original epoxy groups still being unchanged,
   (b) simultaneously or in a second step, the free OH-groups are reacted between ambient temperature and 120° C. with at least one polycarboxylic monoanhydride in the presence of a base, whereby the anhydride group is opened, one COOH-group thereof is esterified and the second COOH-group is at least partially converted into the salt of the corresponding base,
   (c) the product is then isolated per se or in a further step diluted with a suitable solvent alone or together with a further amount of a base.

9. A process as claimed in claim 8 wherein in step (a) 10 to 50% of the epoxide groups of the starting polyepoxide are esterified.

10. A process as claimed in claim 8 wherein the reaction in step (a) is performed between 10° and 140° C. and the reaction in step (b) at a temperature between 30° and 100° C.

11. A process as claimed in claim 8 in which the reaction with the monocarboxylic acid is carried out at the same time as the reaction with the polycarboxylic monoanhydride at a temperature from ambient temperature to 120° C.

12. A process as claimed in claim 8, wherein the reaction is carried out at ambient temperature in the presence of a catalyst.

13. An aqueous coating system containing an epoxide as claimed in claim 1 as a stabilizer in an aqueous polymer dispersion prepared wholly or partly from chlorine-containing monomers or as a stabilizer of the pH in aqueous solutions or dispersions of binders with saponifiable groups.

14. An aqueous system containing an epoxide as claimed in claim 1 as an emulsifier in an emulsion polymerization.

* * * * *